United States Patent
Major

(10) Patent No.: US 7,151,932 B2
(45) Date of Patent: Dec. 19, 2006

(54) METHODS AND APPARATUS FOR FACILITATING THE DELIVERY OF E-MAIL USING A PACKET DATA SERVICE OR A SHORT MESSAGING SERVICE (SMS)

(75) Inventor: Harry Richmond Major, Waterloo (CA)

(73) Assignee: Research in Motion Limited, Waterloo (CA)

( * ) Notice: Subject to any disclaimer, the term of this patent is extended or adjusted under 35 U.S.C. 154(b) by 216 days.

(21) Appl. No.: 10/788,533

(22) Filed: Feb. 27, 2004

(65) Prior Publication Data

US 2005/0197142 A1 Sep. 8, 2005

(51) Int. Cl.
*H04Q 7/20* (2006.01)
(52) U.S. Cl. .............................. 455/435.3; 455/432.1; 455/435.1; 455/466; 455/564; 455/412.1
(58) Field of Classification Search ............. 455/435.3, 455/432.1, 435.1, 466
See application file for complete search history.

(56) References Cited

U.S. PATENT DOCUMENTS

| | | | |
|---|---|---|---|
| 2003/0104827 A1 | 6/2003 | Moran et al. | |
| 2003/0206200 A1 | 11/2003 | Hejl | |
| 2004/0029598 A1* | 2/2004 | Guggisberg | 455/466 |
| 2004/0147278 A1* | 7/2004 | Miramontes | 455/550.1 |
| 2004/0203610 A1* | 10/2004 | Deeds | 455/412.1 |
| 2005/0037755 A1* | 2/2005 | Hind et al. | 455/435.3 |

FOREIGN PATENT DOCUMENTS

WO    WO 2004/012109 A1    2/2004

OTHER PUBLICATIONS

"European Search Report for Application 04251113.9", Aug. 14, 2004.

* cited by examiner

*Primary Examiner*—Lester G. Kincaid
*Assistant Examiner*—Fred A. Casca
(74) *Attorney, Agent, or Firm*—John J. Oskorep, Esq.

(57) ABSTRACT

Methods and apparatus for facilitating the delivery of e-mail messages from a mobile communication device are disclosed. In one disclosed example, an end user of the mobile device enters e-mail message information corresponding to a new e-mail message through a user interface. Preferably, the user interface is an e-mail graphical user interface (GUI) provided by the mobile device. The mobile device identifies whether a packet data service (e.g. GPRS) for communicating e-mail messages is available to it. If the packet data service is available, the mobile device causes the e-mail message information to be sent via the packet data service. If the packet data service is unavailable, however, the mobile device causes the e-mail message information to be sent in a short message service (SMS) message via an SMS-to-Email service. Advantageously, a common GUI interface which does not change depending on the availability of the packet data service is utilized and service-specific formatting for SMS-to-Email by the end user is not required.

23 Claims, 5 Drawing Sheets

FIG. 1
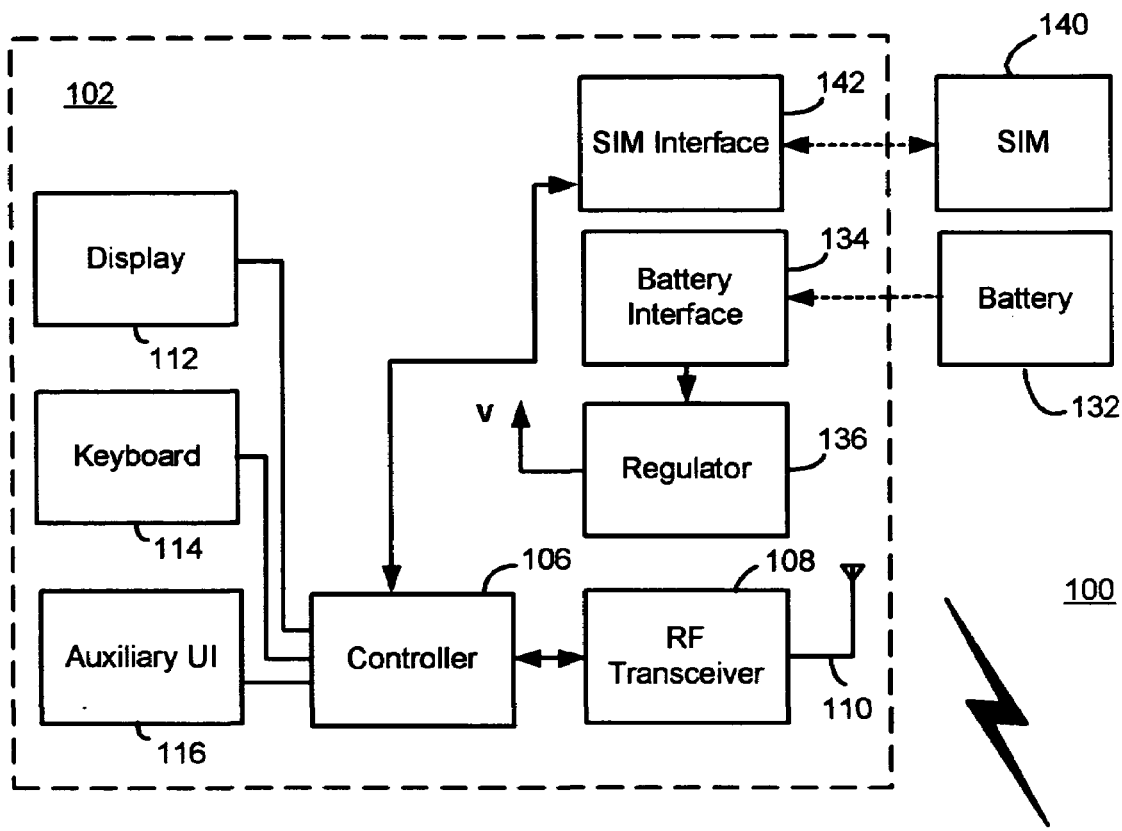
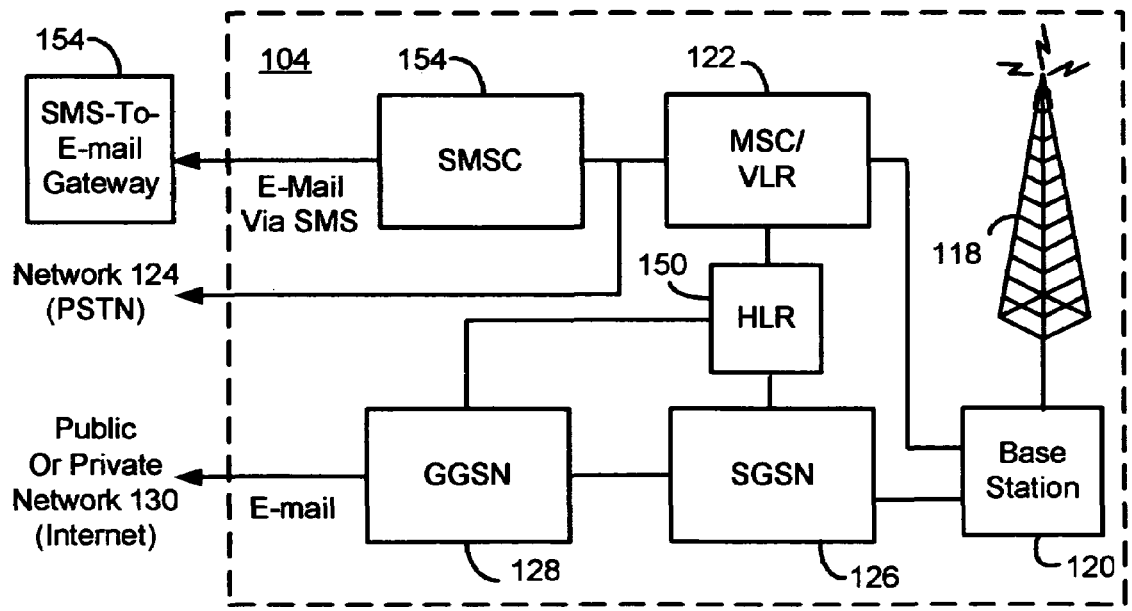

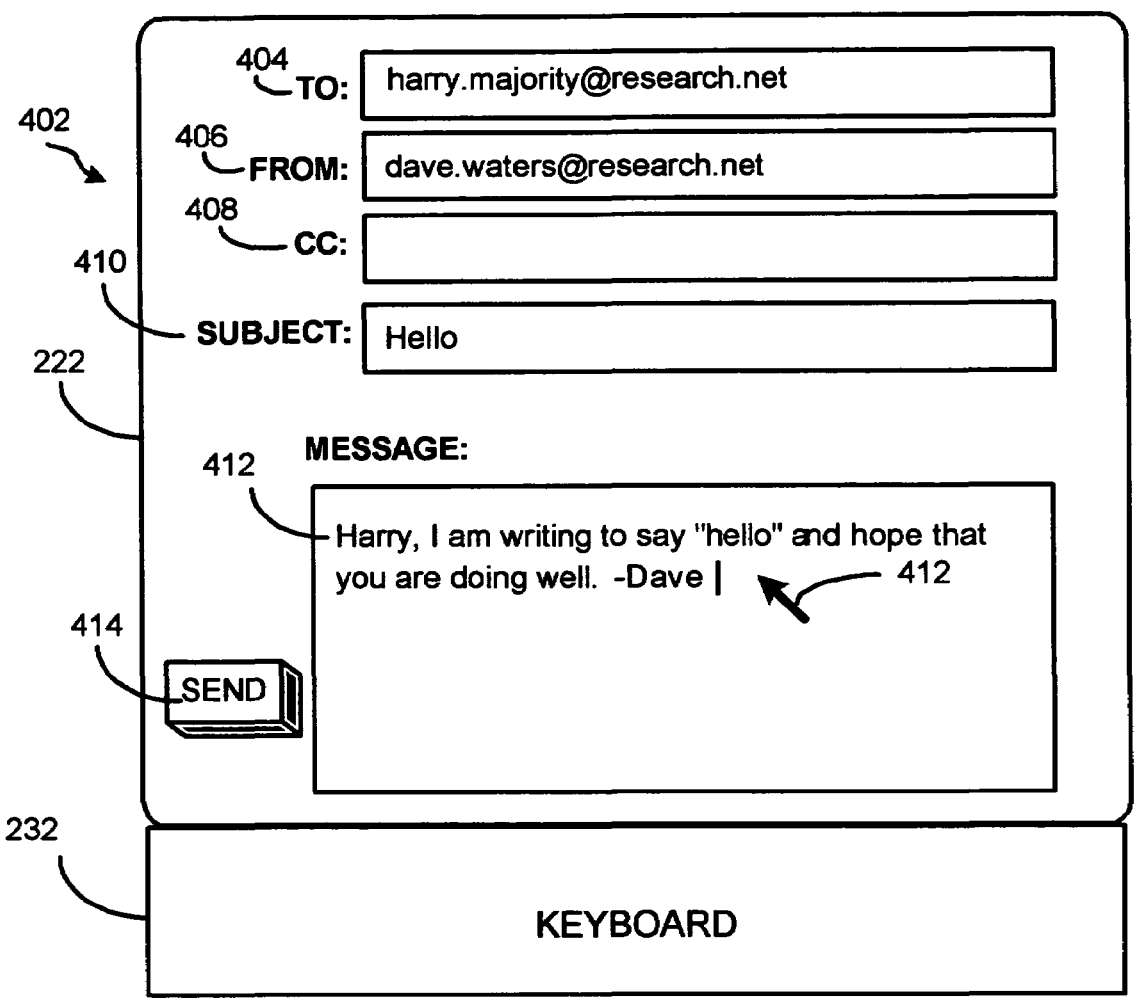

METHODS AND APPARATUS FOR FACILITATING THE DELIVERY OF E-MAIL USING A PACKET DATA SERVICE OR A SHORT MESSAGING SERVICE (SMS)

BACKGROUND

1. Field of the Technology

The present application relates generally to mobile communication devices and the communication of electronic mail ("e-mail") using such devices.

2. Description of the Related Art

Electronic mail ("e-mail") has become pervasive and increasingly important for communication in the modern-day world. Today, even mobile communication devices have the ability to send and receive e-mail messages through wireless communication networks. For example, mobile devices and networks operating in accordance with Global System for Mobile Communications (GSM) and General Packet Radio Service (GPRS) often have the ability to send and receive e-mail and Internet data. The packet data service provided by GPRS makes this possible.

An end user's e-mail messages are typically sent and received through a private host computer which is synchronized with the mobile device through the wireless network. With use of a visual display, the mobile device typically provides an e-mail graphical user interface (GUI) for the entering/reading of e-mail messages. This e-mail GUI provides separate data fields, such as a message recipient field (i.e. a "TO" field), a message sender field (i.e. a "FROM" field), a carbon copy field (i.e. a "CC" field), a message subject field (i.e. a "SUBJECT" field), and a message body field, for the ease of entering/reading e-mail information.

Without GPRS, a GSM network cannot provide for the communication of e-mail messages in a conventional manner. Put another way, when an otherwise e-mail-capable mobile device utilizes a GSM network that does not make GPRS available, the mobile device cannot send or receive e-mail messages. However, GSM is capable of providing for the communication of "short" text messages which are known as "short message service" (SMS) messages. Unlike e-mail, SMS messaging does not involve the use of e-mail-like data fields but rather only a single message field for the entering/reading of the text message.

Beneficially, SMS can also be used for delivering e-mail messages. If activated by the end user, an SMS-to-Email service provided by an SMS-to-Email gateway automatically converts a specified SMS message into an e-mail message for delivery to an intended recipient. The e-mail sender is required to populate the text message field of the SMS message with separate items of "e-mail" information, such as the message recipient, the message subject, and the message body. However, the SMS-to-Email gateway requires that these separate items be formatted in a particular order and/or with specific codes.

One SMS-to-Email service, for example, requires that the information be entered into the SMS message field in accordance with the following predetermined format:

EMAIL user@domain.subject.message where "EMAIL" is the actual word "EMAIL", "user@domain" is the e-mail address of the intended message recipient, "subject" is the e-mail message subject, and "message" is the e-mail message body. As apparent, such special formatting is not user-friendly and may be forgotten by the end user. Even if the SMS-to-Email formatting were user-friendly and easy to remember, the mobile device undesirably provides two different user interfaces for delivering e-mail messages which depends on the availability of the packet data network.

Accordingly, it is desirable to facilitate the delivery of e-mail messages using a common standard e-mail GUI on a mobile device which does not vary depending on whether a particular data communication service (e.g. a packet data service such as GPRS) is available.

SUMMARY

Methods and apparatus for facilitating the delivery of e-mail messages from a mobile communication device are described herein. In one illustrative method, an end user of the mobile device enters e-mail message information corresponding to a new e-mail message through a user interface. Preferably, this user interface is an e-mail graphical user interface (GUI) provided by the mobile device. The mobile device identifies whether a data communication service for communicating e-mail messages (e.g. a packet data service such as GPRS) is available to it. Based on identifying that the data communication service is available, the mobile device causes the e-mail message information to be sent via this data communication service. Based on identifying that the data communication service is unavailable, however, the mobile device causes the e-mail message information to be sent in a short message service (SMS) message via an SMS-to-Email service.

Advantageously, a common GUI interface which does not vary depending on the availability of the data communication service is utilized and service-specific formatting for SMS-to-Email by the end user is not required.

BRIEF DESCRIPTION OF THE DRAWINGS

Embodiments of present invention will now be described by way of example with reference to attached figures, wherein:

FIG. 1 is a block diagram of a communication system which includes a mobile communication device for communicating in a wireless network which makes a data communication service available for electronic mail ("e-mail") message delivery;

FIG. 4 is an illustration of a graphical user interface (GUI) of the mobile device for facilitating the delivery of e-mail messages;

FIG. 5 is an exemplary message format for a Short Message Service (SMS) message when it is desired to send an e-mail message via SMS.

DETAILED DESCRIPTION OF THE PREFERRED EMBODIMENTS

Figure 2:
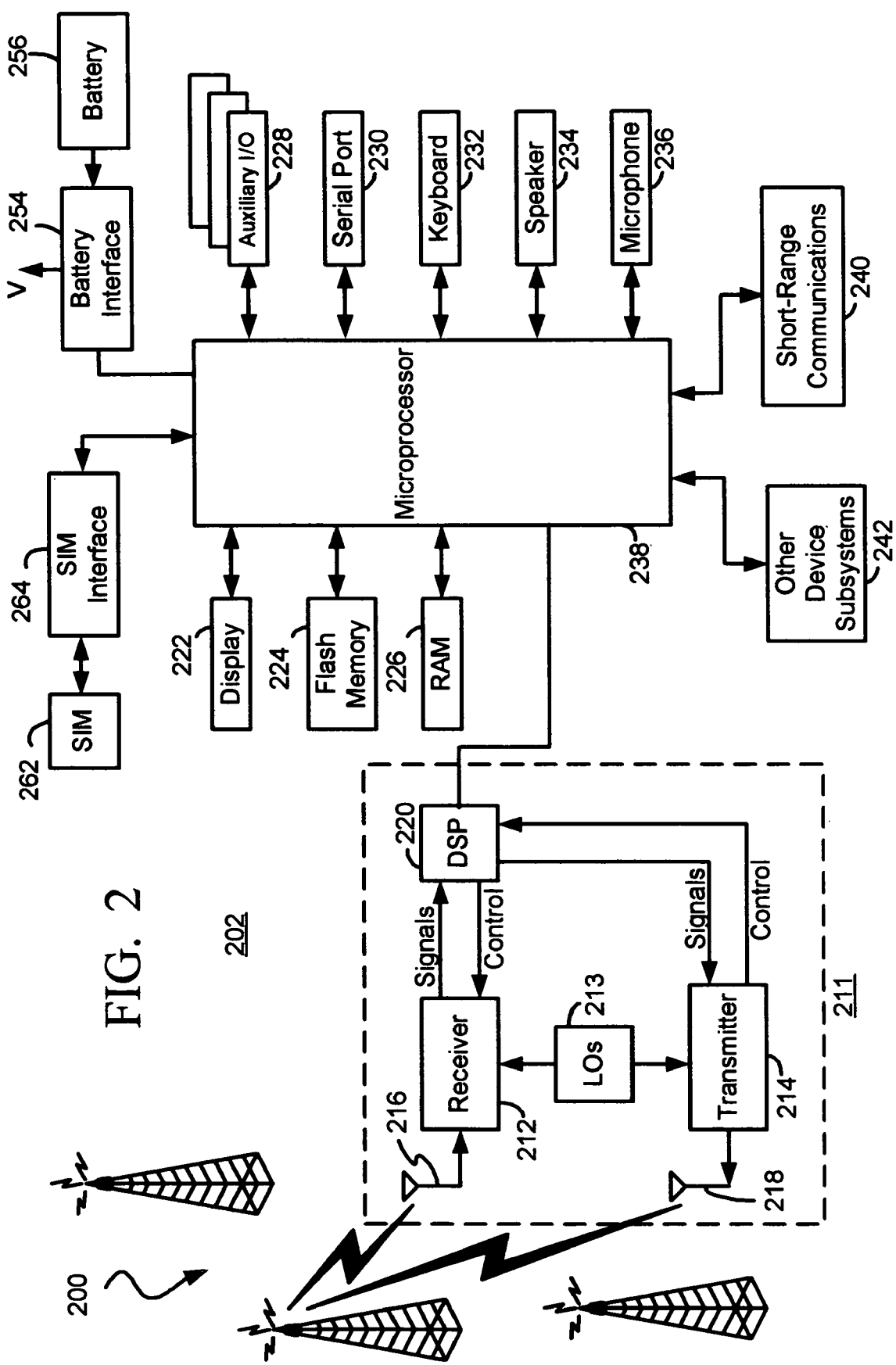
FIG. 2 is a more detailed example of a mobile device used in the wireless network of FIG. 1.

Methods and apparatus for use in facilitating the delivery of e-mail messages from a mobile communication device are described herein. In one method, the steps include receiving, through a user interface, e-mail message information corresponding to a new e-mail message to be delivered; identifying whether a data communication service for communicating e-mail messages is available; causing the e-mail message information to be sent via the data communication service based on the data communication service being available; and otherwise, causing the e-mail message information to be sent in a short message service (SMS) message via an SMS-to-Email service based on the data communication service being unavailable.

FIG. 1 is a block diagram of a communication system 100 which includes a mobile communication device 102 which communicates through a wireless communication network 104. In the preferred embodiment, mobile communication device 102 is a mobile station and therefore this term is used substantially throughout the specification. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard (preferably a full QWERTY-type keyboard), is normally provided for entering data for storage in mobile station 102, information for transmission to network 104, a telephone number to place a telephone call, commands to be executed on mobile station 102, and possibly other or different user inputs.

Being a mobile/portable electronic device, mobile station 102 includes a battery interface 134 for receiving one or more rechargeable batteries 132. Battery 132 provides electrical power to (most if not all) electrical circuitry in mobile station 102, and battery interface 134 provides for a mechanical and electrical connection for battery 132. Battery interface 134 is coupled to a regulator 136 which regulates power for the device.

Mobile station 102 sends communication signals to and receives communication signals from network 104 over a wireless link via antenna 110. RF transceiver circuitry 108 and antenna 110 perform functions similar to those of base station 120 and antenna tower 118, including for example modulation/demodulation and possibly encoding/decoding and encryption/decryption. It will be apparent to those skilled in art that RF transceiver circuitry 108 will be adapted to particular wireless network or networks in which mobile station 102 is intended to operate.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the wireless terminal is not fully operational for communication through wireless network 104. By inserting SIM 140 into the wireless terminal, an end user can have access to any and all of his/her subscribed services. In order to identify the subscriber, SIM 140 contains some user parameters such as an International Mobile Subscriber Identity (IMSI). In addition, SIM 140 is typically protected by a four-digit Personal Identification Number (PIN) which is stored therein and known only by the end user. An advantage of using SIM 140 is that end users are not necessarily bound by any single physical wireless device. Typically, the only element that personalizes a wireless terminal is a SIM card. Therefore, the user can access subscribed services using any wireless terminal equipped to operate with the user's SIM.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above.

In FIG. 1, mobile station 102 communicates through wireless communication network 104. In the embodiment of FIG. 1, wireless network 104 is a Global System for Mobile Communications (GSM) and General Packet Radio Service (GPRS) network. Wireless network 104 includes a base station 120 with an associated antenna tower 118, a Mobile Switching Center (MSC) 122, a Home Location Register (HLR) 150, a Serving General Packet Radio Service (GPRS) Support Node (SGSN) 126, and a Gateway GPRS Support Node (GGSN) 128. MSC 122 is coupled to base station 120 and to a telephone network, such as a landline network 124 (e.g. Public Switched Telephone Network or PSTN). SGSN 126 is coupled to base station 120 and to GGSN 128, which is in turn coupled to a public or private data network 130 (such as the Internet). HLR 150 is coupled to MSC 122, SGSN 126, and GGSN 128.

Base station 120, including its associated controller and antenna tower 118, provides wireless network coverage for a particular coverage area commonly referred to as a "cell". Base station 120 transmits communication signals to and receives communication signals from mobile stations within its cell via antenna tower 118. Base station 120 normally performs such functions as modulation and possibly encoding and/or encryption of signals to be transmitted to the mobile station in accordance with particular, usually predetermined, communication protocols and parameters, under control of its controller. Base station 120 similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 150. In case of a voice call to mobile station 102, HLR 150 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 150 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

MSC 122 is also coupled to a Short Message Service Center (SMSC) 154 for the communication of Short Message Service (SMS) messages. SMS makes use of SMSC 128 which acts as a store-and-forward system for relaying short messages. Messages are stored in the network until the destination device becomes available, so an end user can receive or transmit an SMS message at any time, whether a voice call is in progress or not. SMSC 154 may communicate with a SMS-to-Email gateway 154 for the delivery of e-mail messages via SMS, details of which are provided later below.

Being part of the GPRS network, Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by base station 120 instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202 which may be utilized in system 100 of FIG. 1. Mobile station 202 is a two-way communication device having at least voice and data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) which regulates power to all of the circuitry.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access requirements will also vary depending upon type of network utilized. In GPRS networks, for example, network access is associated with a subscriber or user of mobile station 202. A GPRS device therefore requires a Subscriber Identity Module, commonly referred to as a SIM card (i.e. SIM 262 of FIG. 2), in order to operate on the GPRS network. Without SIM 262 inserted in a SIM interface 264, mobile station 202 will not be fully functional. Local or non-network communication functions (if any) may be operable, but mobile station 202 will be unable to carry out any functions involving communications over the network. SIM 262 includes those features described in relation to FIG. 1 (i.e. those described for SIM 140 of FIG. 1).

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines extend between a SIM interface 264 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages or short message service (SMS) messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. The handling and delivery of e-mail message information will be described later below in relation to FIGS. 4–6.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with an end user's desktop computer is a desirable, albeit optional, component. Serial port 230 enables an end user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
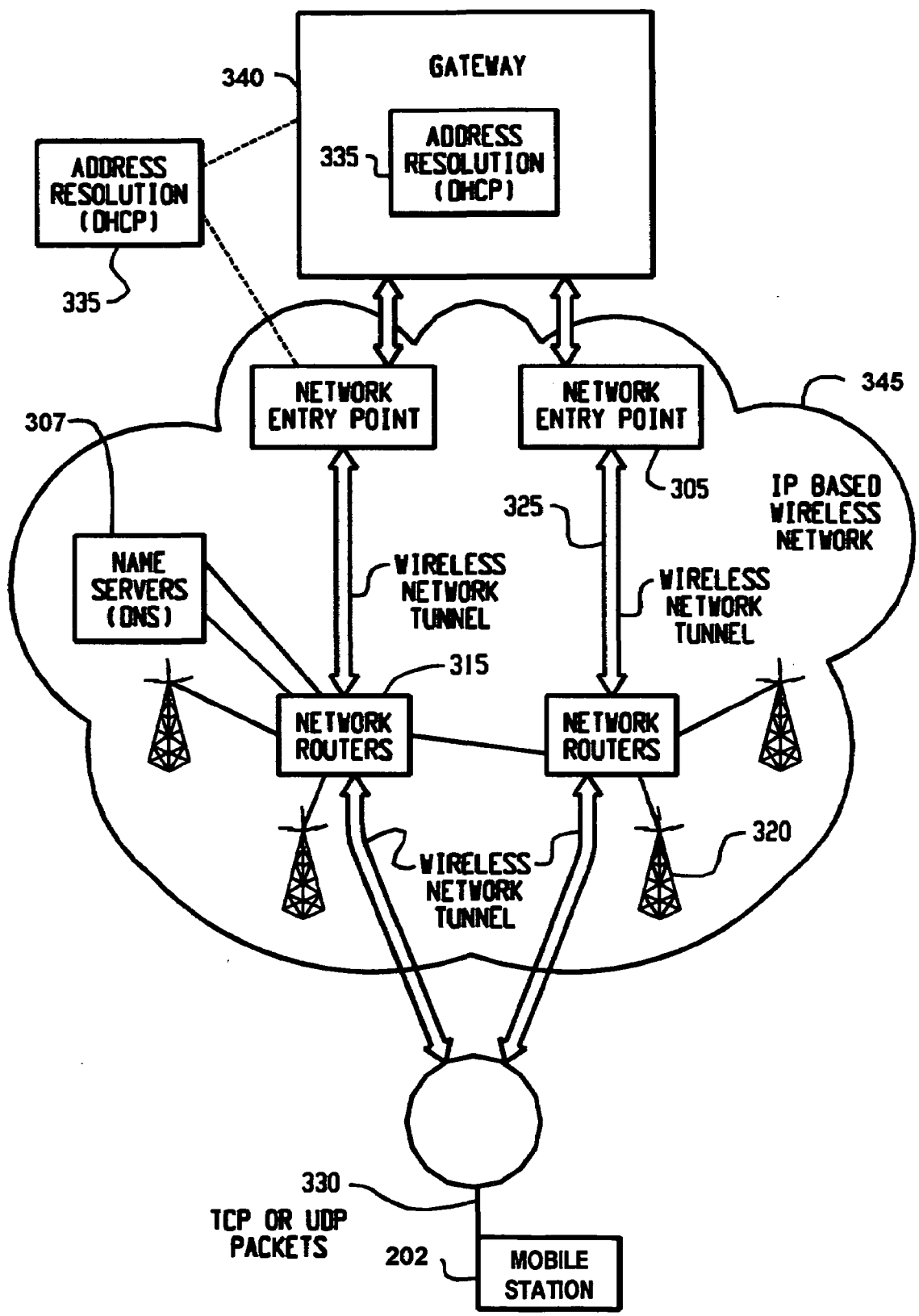
FIG. 3 is a particular structure of the system for communicating with the mobile device of FIG. 1 or 2.

FIG. 3 shows a particular system structure for communicating with mobile station 202. In particular, FIG. 3 shows basic components of an IP-based wireless data network, such as a GPRS network. Mobile station 202 of FIG. 3 communicates with a wireless packet data network 145, and may also be capable of communicating with a wireless voice network (not shown). The voice network may be associated with IP-based wireless network 145 similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305.

As shown in FIG. 3, a gateway 340 may be coupled to an internal or external address resolution component 335 and one or more network entry points 305. Data packets are transmitted from gateway 140, which is source of information to be transmitted to mobile station 202, through network 345 by setting up a wireless network tunnel 325 from gateway 340 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus preferable for mobile station 202 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of base stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to mobile stations such as mobile station 202.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, mobile station 202 must use a specific technique associated with wireless network 345. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 202 for redundancy, or to access different gateways and services on the network. Once the domain name is found, the tunnel is then extended to network entry point 305 and necessary resources are allocated at each of the nodes along the way.

Network entry point 305 then uses the address resolution (or DHCP 335) component to allocate an IP address for mobile station 202. When an IP address has been allocated to mobile station 202 and communicated to gateway 340, information can then be forwarded from gateway 340 to mobile station 202.

Wireless tunnel 325 typically has a limited life, depending on mobile station's 202 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily reserved for mobile station 202 when wireless tunnel 325 was first opened. Once the IP address is lost and wireless-tunnel 325 is torn down, gateway 340 loses all ability to initiate IP data packets to mobile station 202, whether over Transmission Control Protocol (TCP) or over User Datagram Protocol (UDP).

In this application, a wireless packet data network (one specific type of wireless communication network) may include but is not limited to: (1) a Code Division Multiple Access (CDMA) network that has been developed and operated by Qualcomm; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS). The infrastructure shown and described in relation to FIG. 3 may be representative of each one of a number of different networks which are provided and available in the same geographic region. Preferably, the wireless network and data communication service operates in accordance a 2.5 Generation (2.5G) compatible standard, a $3^{rd}$ Generation (3G) compatible standard, or better (later version) standard.

E-mail Message Delivery Techniques. Details regarding the inventive methods and apparatus for use in facilitating the delivery of e-mail messages will now be described. In one illustrative example, an end user of the mobile device enters e-mail message information corresponding to a new e-mail message through a graphical user interface (GUI) of the mobile device. Before attempting to send the new e-mail message, the mobile device identifies whether a data communication service for communicating e-mail messages is available to it. This data communication service may be a packet data service such as GPRS. Based on identifying that the data communication service is available, the mobile device causes the e-mail message information to be sent via the data communication service. Based on identifying that the data communication service is unavailable, however, the mobile device causes the e-mail message information to be sent in a short message service (SMS) message via an SMS-to-Email service. Advantageously, a common GUI interface which does not change depending on the availability of the data communication service is utilized and service-specific formatting for SMS-to-Email by the end user is not required.

Referring to FIG. 4, an illustration of a user interface for facilitating the delivery of electronic mail (e-mail) messages is shown. In FIG. 4, the user interface is a graphical user interface (GUI) 402 which involves the use of display 222, keyboard 232, and optionally a mouse or similar device (not shown) for moving a cursor 412. Display 222 is shown as visually displaying graphics, text, and data entry fields for GUI 402 to better facilitate the creation and entry of a new e-mail message by the end user. As shown, the data entry fields of GUI 402 include a data entry field 404 for an e-mail recipient address ("TO"), a data entry field 406 for an e-mail sender address ("FROM"), a data entry field 408 for a carbon copy ("CC") recipient address, a data entry field 410 for an e-mail subject ("SUBJECT"), and a data entry field 412 for the e-mail body ("MESSAGE"). GUI 402 may also provide one or more visual action objects, such as a "SEND" button 414 which, when actuated, will cause the e-mail message to be delivered to the address specified in data entry field 404.

A specific example of a newly drafted e-mail message is shown in FIG. 4. As shown, the e-mail recipient address in data entry field 404 is "harry.majority@research.net", the e-mail sender address in data entry field 406 is "dave.waters@research.net", the e-mail subject in data entry field 410 is "Hello", and the e-mail message reads "Harry, I am writing to say "hello" and hope that you are doing well. -Dave". The end user had previously created and entered this text in data fields 404, 406, 410, and 412, and will subsequently actuate SEND button 414 to send the e-mail message.

Immediately after SEND button 414 is actuated by the end user, the mobile device operates as follows. If a data communication service for delivering e-mail messages is available in the wireless network within which the mobile device is currently operating, the mobile device will send the e-mail message using the data communication service. In the embodiment described, the data communication service is a packet data service. The packet data service may be, for example, General Packet Radio Service (GPRS) which is available as an overlay on Global System for Mobile Communications (GSM) networks. However, not all GSM networks have been upgraded with the GPRS overlay; nor are services continuously available for various reasons. Thus, if the data communication service for delivering e-mail messages in the wireless network is unavailable, the mobile device will send the e-mail message via Short Message Service (SMS). In particular, the mobile device will automatically input the e-mail message information into an SMS message in a format compatible with an SMS-to-Email service. The mobile station transmits this SMS message to an SMS-to-Email server or gateway so that the e-mail message can be delivered to the intended recipient address via the SMS-to-Email gateway. The mobile device sends this SMS message to a telephone number associated with the SMS-to-Email gateway.

As described earlier above in the Background section, an SMS-to-Email service requires that message information be entered into the SMS message field in accordance with a predetermined format. One particular SMS-to-Email service, for example, requires the following predetermined format:

EMAIL user@domain.subject.message where "EMAIL" is the actual word "EMAIL", "user@domain" is the e-mail address of the intended message recipient, "subject" is the e-mail message subject, and "message" is the e-mail message body. FIG. 5 illustrates the manner in which the e-mail message of FIG. 4 would have to be formatted and entered into an SMS message field 502 based on the above-specified SMS-to-Email format. As shown, the single text field reads as follows:

EMAIL harry.majority@research.net.Hello.Harry, I am writing to say "hello" and hope that you are doing well. -Dave In accordance with the present techniques, the formatting and sending of the e-mail information in an SMS message via SMS-to-Email is performed automatically without further user intervention after the end user actuates the SEND object from the e-mail GUI. Preferably, this operation is completely transparent to the end user. In a slight variation, the visual display may prompt the end user to answer "YES" or "NO" in response to the question "DATA SERVICE UNAVAILABLE. SEND E-MAIL BY SMS?" or similar inquiry. In another variation, the mobile device causes a visual indication to be displayed in its display such as "SENDING E-MAIL BY SMS . . . " or "E-MAIL SENT BY SMS". In even another variation, the end user may be prompted to enter a telephone number of the SMS-to-Email gateway, at least for the first use of the SMS-to-Email gateway. After the telephone number of the SMS-to-Email gateway is inputted the first time, the mobile station stores it in memory for SMS-to-Email subsequent usage without subsequent user intervention.

The conventional user interface and required end user formatting of an SMS-to-Email message are not user-friendly. A conventional mobile device undesirably involves two different user interfaces for delivering e-mail messages, the availability of which depends on the availability of the data communication service. In accordance with the present techniques, however, a single e-mail GUI which does not change depending on the availability of the data communication service is provided for e-mail message delivery.

Figure 6:
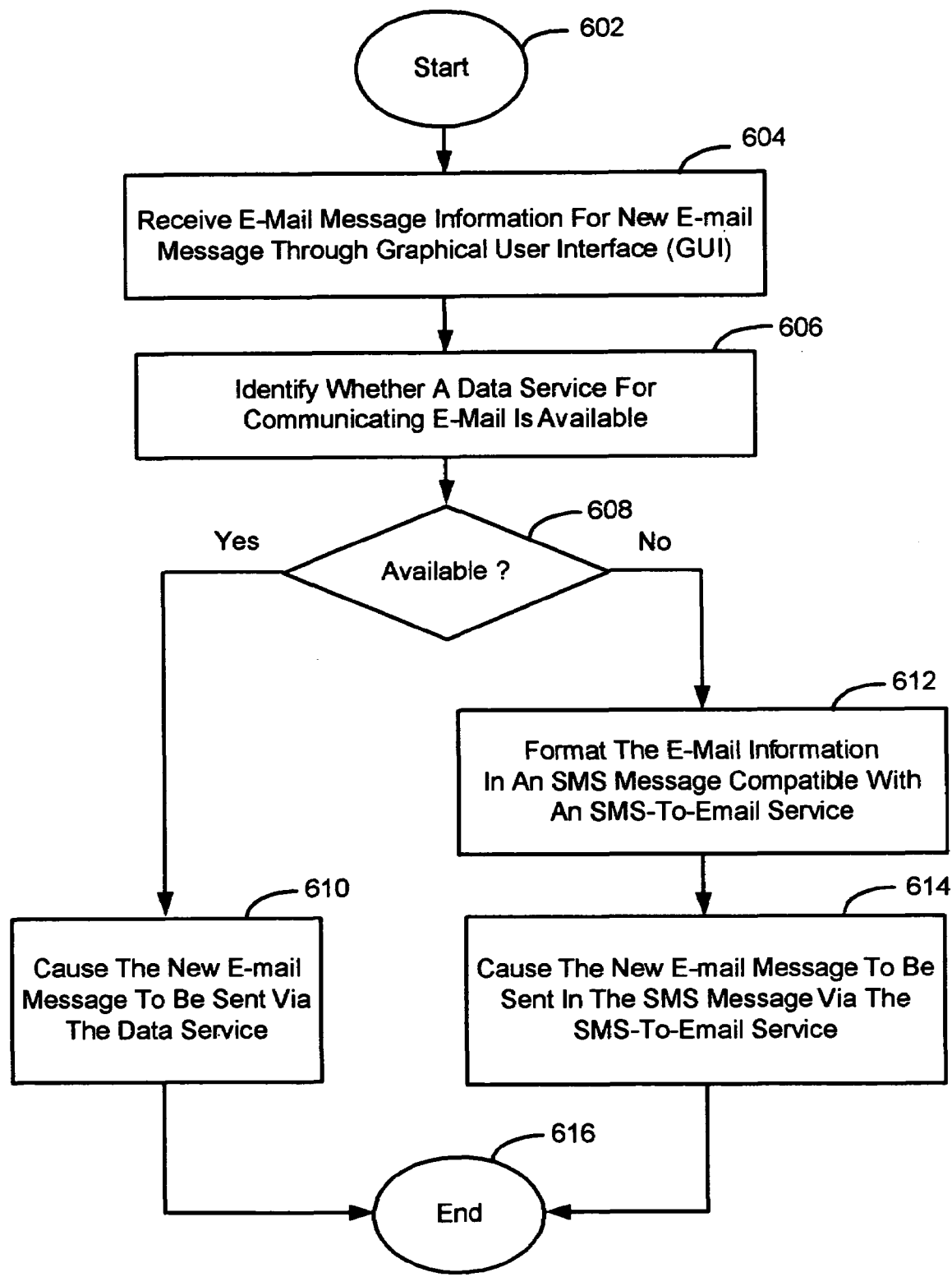
FIG. 6 is a flowchart which describes a method for use in facilitating the delivery of e-mail messages.

FIG. 6 is a flowchart which describes a method of facilitating the delivery of e-mail messages from a mobile communication device (e.g. mobile device 102 of FIG. 1 or mobile device 202 of FIG. 2). This method describes logic which may be followed by computer instructions which are stored in a computer instruction storage medium (e.g. in memory or computer disk) and executed by a controller or processor of the mobile device (e.g. controller 106 of FIG. 1 or microprocessor 238 of FIG. 2).

Beginning at a start block 602, e-mail message information for a newly drafted e-mail message is received from an end user through a user interface of the mobile device (step 604). Preferably, the user interface is a graphical user interface (GUI) of the mobile device. For example, see FIG. 4 and the discussion in relation thereto. The e-mail message information that is received from the end user includes text data entered into data entry fields of the e-mail GUI, which may include an e-mail recipient address (e.g. from the "TO" field), an e-mail sender address (e.g. from the "FROM" field), a carbon copy recipient address (e.g. from the "CC" field), an e-mail subject (e.g. from the "SUBJECT" field), and an e-mail message body (e.g. from the "MESSAGE" field).

Prior to sending the new e-mail message, the mobile device identifies whether a data communication service for communicating e-mail messages is available through the wireless network within which the mobile device is currently operating (step 606). In the embodiment described, the data communication service utilized is a packet data service. The packet data service may be, for example, General Packet Radio Service (GPRS) which is available as an overlay on Global System for Mobile Communications (GSM) networks. However, not all GSM networks have been upgraded with the GPRS overlay; nor are services continuously available for various reasons.

The mobile device may detect whether the data communication service is available using any one of a number of different techniques. For example, control message information received from the network may indicate the availability or status of any such services. As another example, the mobile device may make an actual attempt to utilize the data communication service and the outcome (its success or failure) can provide an indication of the service availability or status. As even another example, the mobile device may make an actual attempt to utilize e-mail and the outcome (its success or failure) can provide an indication of the service availability or status. Such detection may be performed at step 606, or well before step 604 (e.g. when the mobile device enters into a new wireless network).

Based on identifying that the data communication service is available at step 608, the mobile device causes the e-mail message information to be sent via the data communication service (step 610). Based on identifying that the data communication service is unavailable at step 608, however, the mobile device causes the e-mail message information to be sent via a short message service (SMS). In particular, the mobile device will automatically input the e-mail message information into an SMS message in a format compatible with an SMS-to-Email service (step 612). The mobile station then causes this SMS message to be transmitted to an SMS-to-Email gateway or server so that the e-mail message can be delivered to the intended recipient address via the SMS-to-Email gateway (step 614). The mobile device sends this SMS message to a telephone number associated with the SMS-to-Email gateway. The flowchart ends at an end block 616, but the method preferably repeats for each e-mail delivery.

As described earlier above, the end user may be prompted to enter a telephone number of the SMS-to-Email gateway, at least for the first use of the SMS-to-Email gateway. This may occur at steps 612 and 614, or even well before delivering any e-mail messages. After the telephone number of the SMS-to-Email gateway is inputted the first time, the mobile station stores it in memory for SMS-to-Email subsequent usage without further user intervention.

Final Comments. Methods and apparatus for use in facilitating the delivery of e-mail messages from a mobile communication device have been described. In one method, the steps include receiving, through a user interface, e-mail message information corresponding to a new e-mail message to be delivered; identifying whether a data communication service for communicating e-mail messages is available; causing the e-mail message information to be sent via the data communication service based on the data communication service being available; and otherwise, causing the e-mail message information to be sent in a short message service (SMS) message via an SMS-to-Email service based on the data communication service being unavailable.

In a related and broader method, the mobile station identifies whether a packet data service for communicating e-mail messages is available and causes a newly drafted e-mail message to be sent in a short message service (SMS) message via an SMS-to-Email service based on the packet data service being unavailable.

A mobile communication device of the present application may include a receiver; a transmitter; a user interface; one or more processors coupled to the receiver, the transmitter, and the user interface; wherein the one or more processors are operative to receive, through the user interface, e-mail message information corresponding to a new e-mail message to be delivered; identify whether a packet data service for communicating e-mail messages is available to the mobile communication device; cause the e-mail message information to be transmitted via the packet data service based on the packet data service being available; and otherwise cause the e-mail message information to be transmitted in a short message service (SMS) message via an SMS-to-Email service based on the packet data service being unavailable.

A computer program product of the present application may include a computer instruction storage medium (such as memory or computer disk); computer instructions stored on the computer instruction storage medium; wherein the computer instructions are executable on a processor for receiving, through a user interface, e-mail message information corresponding to a new e-mail message to be delivered; identifying whether a data communication service for communicating e-mail messages is available; causing the e-mail message information to be sent via the data communication service based on the data communication service being available; and otherwise, causing the e-mail message information to be sent in a short message service (SMS) message via an SMS-to-Email service based on the data communication service being unavailable.

Advantageously, a GUI interface which does not change (substantially) based on the data service availability is utilized and service-specific formatting for SMS-to-Email by the end user is not required. The above-described embodiments of invention are intended to be examples only. Alterations, modifications, and variations may be effected to particular embodiments by those of skill in art without departing from scope of invention, which is defined solely by claims appended hereto.

What is claimed is:

1. In a mobile communication device, a method of delivering an e-mail message through a wireless communication network comprising the acts of:
    receiving, through an e-mail graphical user interface (GUI) of the mobile communication device, e-mail message information corresponding to a new e-mail message to be delivered through the wireless communication network;
    identifying, by the mobile communication device, whether a packet data service for communicating e-mail messages is made available to the mobile communication device by the wireless communication network;
    if the packet data service is identified as being made available in the wireless communication network:
        causing, by the mobile communication device, the e-mail message information to be sent via the packet data service of the wireless communication network;
    if the packet data service is identified as being made unavailable in the wireless communication network:
        formatting, by the mobile communication device, the e-mail message information in an SMS-to-Email message format compatible with an SMS-to-Email service; and
    causing the formatted e-mail message information to be sent in an SMS message through the wireless communication network via the SMS-to-Email service.

2. The method of claim 1, wherein the act of causing the formatted e-mail message information to be sent via the SMS-to-Email service comprises the further act of causing the SMS message to be sent to a telephone number of the SMS-to-Email service.

3. The method of claim 1, wherein the packet data service operates in accordance with a 2.5 Generation (2.5G) compatible standard.

4. The method of claim 1, wherein the packet data service operates in accordance with a $3^{rd}$ Generation (3G) compatible standard.

5. The method of claim 1, wherein the act of formatting is performed by the mobile communication device without user intervention.

6. The method of claim 1, wherein the e-mail message information comprises an e-mail message body of text.

7. The method of claim 1, wherein the e-mail message information comprises an e-mail destination address.

8. The method of claim 1, wherein the e-mail message information comprises an e-mail subject line.

9. A mobile communication device, comprising:
a receiver;
a transmitter;
a user interface which includes a visual display;
one or more processors coupled to the receiver, the transmitter, and the user interface; and
the one or more processors being operative to:
  receive, through an e-mail a graphical user interface (GUI) provided for in the visual display, e-mail message information corresponding to a new e-mail message to be delivered through a wireless communication network;
  identify whether a packet data service for communicating e-mail messages is made available to the mobile communication device by the wireless communication network;
  if the packet data service is identified as being made unavailable in the wireless communication network by the one or more processors:
    formatting, by the one or more processors, the e-mail message information in an SMS-to-Email message format compatible with an SMS-to-Email service; and
    cause the formatted e-mail message information to be transmitted in an SMS message via the SMS-to-Email service.

10. The mobile communication device of claim 9, further comprising:
  causing the newly drafted e-mail message to be sent via the packet data service based on the packet data service being identified as made available.

11. The mobile communication device of claim 9, wherein the one or more processors cause the formatted e-mail message information to be transmitted via the SMS-to-Email service by being further operative to cause the SMS message to be sent to a telephone number of the SMS-to-Email service.

12. The mobile communication device of claim 9, the one or more processors being further operative to format the e-mail message information without user intervention.

13. The mobile communication device of claim 9, wherein the packet data service operates in accordance with a 2.5 Generation (2.5G) compatible standard.

14. The mobile communication device of claim 9, wherein the packet data service operates in accordance with a $3^{rd}$ Generation (3G) compatible standard.

15. A computer program product comprising:
a data storage medium;
computer instructions stored on the data storage medium;
the computer instructions being executable on a processor for:
  receiving, through an e-mail graphical user interface (GUI), e-mail message information corresponding to a new e-mail message to be delivered;
  identifying whether a packet data service for communicating e-mail messages is made available to a mobile communication device by a wireless communication network;
  if the packet data service is identified as being made unavailable in the wireless communication network:
    formatting, by the computer instructions, the e-mail message information in an SMS-to-Email message format compatible with an SMS-to-Email service; and
    causing the formatted e-mail message information to be sent in an SMS message through the wireless communication network via the SMS-to-Email service.

16. The computer program product of claim 15, further comprising:
  if the packet data service is identified as being made available in the wireless communication network:
    causing the e-mail message information to be sent via the packet data service of the wireless communication network.

17. The computer program product of claim 15, wherein the computer instructions are further executable on a processor for causing the formatted e-mail message information to be sent via the SMS-to-Email service by causing the SMS message to be sent to a telephone number of the SMS-to-Email service.

18. The computer program product of claim 15, the computer instructions being further executable on a processor for formatting the e-mail message information in the SMS-to-Email message format without user intervention.

19. The computer program product of claim 15, wherein the packet data service comprises a $3^{rd}$ Generation (3G) data service.

20. A method of delivering an e-mail message through a wireless communication network comprising the acts of:
  receiving, through an e-mail graphical user interface (GUI) of a mobile communication device, e-mail message information corresponding to a newly drafted e-mail message to be delivered through the wireless communication network;
  identifying, by the mobile communication device, whether a packet data service for communicating e-mail messages is made available to the mobile communication device by the wireless communication network;
  if the packet data service is identified as being made unavailable in the wireless communication network:
    formatting, by the mobile communication device, the e-mail message information in an SMS-to-Email message format compatible with an SMS-to-Email service; and
    causing the formatted e-mail message information to be sent in an SMS message of the wireless communication network via the SMS-to-Email service.

21. The method of claim 20, further comprising:
causing the newly drafted e-mail message to be sent via the packet data service based on the packet data service being identified as made available by the wireless communication network.

22. The method of claim 20, further comprising:
causing the newly drafted e-mail message to be sent via the packet data service based on the packet data service being identified as made available by the wireless communication network; and
wherein the e-mail message information comprises an e-mail destination address and an e-mail message body of text.

23. The method of claim 20, further comprising:
wherein the e-mail message information comprises an e-mail destination address and an e-mail message body of text; and
wherein the act of causing the e-mail message information to be sent via the SMS-to-Email service comprises the further act of causing the SMS message to be sent to a telephone number of the SMS-to-Email service.

* * * * *